United States Patent [19]
Jang et al.

[11] Patent Number: 5,590,751
[45] Date of Patent: Jan. 7, 1997

[54] HYDRAULIC CONTROL SYSTEM FOR AUTOMATIC TRANSMISSION

[75] Inventors: Jaeduk Jang; Donghoon Park; Kibeen Lim, all of Kyungki-do, Rep. of Korea

[73] Assignee: Hyundai Motor Company, Seoul, Rep. of Korea

[21] Appl. No.: 343,497

[22] PCT Filed: Dec. 29, 1993

[86] PCT No.: PCT/KR93/00119

§ 371 Date: Nov. 29, 1994

§ 102(e) Date: Nov. 29, 1994

[87] PCT Pub. No.: WO95/18025

PCT Pub. Date: Jul. 6, 1995

[51] Int. Cl.$^6$ .......................... F16D 33/00; B60K 41/10
[52] U.S. Cl. .................. 192/3.29; 192/3.31; 477/169
[58] Field of Search ...................... 192/3.29, 3.3, 192/3.31, 3.33; 477/168, 169, 174, 175

[56] References Cited

U.S. PATENT DOCUMENTS

| | | | |
|---|---|---|---|
| 4,572,338 | 2/1986 | Miki . | |
| 4,585,102 | 4/1986 | Sugano | 192/3.29 X |
| 4,595,088 | 6/1986 | Sugano | 477/168 X |
| 4,664,235 | 5/1987 | Yokoyama et al. | 477/168 X |
| 4,781,080 | 11/1988 | Iwatsuki . | |
| 4,880,091 | 11/1989 | Hasegawa et al. | 192/3.29 X |
| 4,989,702 | 2/1991 | Yoshimura et al. | 192/3.29 |
| 5,048,655 | 9/1991 | Seeba | 477/175 |
| 5,085,103 | 2/1992 | Ando et al. . | |
| 5,086,894 | 2/1992 | Iizuka et al. | 477/174 X |
| 5,090,527 | 2/1992 | Imamura et al. | 192/3.29 |
| 5,152,386 | 10/1992 | Imamura | 477/168 |

FOREIGN PATENT DOCUMENTS

| | | | |
|---|---|---|---|
| 2178119 | 2/1987 | United Kingdom . | |

*Primary Examiner*—Andrea L. Pitts

[57] ABSTRACT

The present invention relates to a hydraulic control system for an automatic transmission, including an oil pump, a plurality of shift valves for controlling a friction device in accordance with a vehicle's speed and transmitting a torque of a torque converter to a gear of a multi-stage transmission gear mechanism. A manual valve is provided for selectively supplying the hydraulic pressure generated from the oil pump to each shift valve by changing ports thereof. A reducing valve regulates the hydraulic pressure to be lower than a line pressure, and a pressure regulating valve receives a control pressure and changes the line pressure. A rear clutch exhaust valve directly supplies the hydraulic pressure supplied from the manual valve to a rear clutch in a first forward speed ratio of a drive "D" range. Two shift control solenoid valves supply the hydraulic pressure supplied from the manual valve to a second, a third and fourth speed lines in a second, a third, and a fourth forward speed ratios, respectively. A shift control valve selectively opens the second, third, and fourth speed lines by moving a valve spool thereof and a damper clutch control valve supplies the hydraulic pressure to a damper clutch engaging line or releasing line by moving a valve spool thereof which is moved in accordance with exhausting or cutting off the hydraulic pressure of the reducing valve.

4 Claims, 3 Drawing Sheets

HYDRAULIC CONTROL SYSTEM FOR AUTOMATIC TRANSMISSION

BACKGROUND OF THE INVENTION

1. Field of the Invention

The present invention relates to a hydraulic control system for an automatic transmission, and more particularly to the control system which can ensure a control of a damper clutch and minimize a loss of drive of an oil pump.

2. Description of Related Art

Generally, an oil pump driven by a driving force generates a hydraulic pressure for engaging a friction element which changes a speed ratio by selecting a gear stage of gear stages of a multi-stage transmission gear mechanism.

A hydraulic control system pressurized by an oil pump changes ports of shift valves in accordance with an operation of a solenoid valve or proportional control valves which are controlled to be turned ON/OFF or duty by a transmission control unit.

At this point, the line pressure is supplied to the selected friction member through the changed port to engage or release the friction member.

The oil pump generates the hydraulic pressure in proportion to the number of rotation of the engine. To establish a stable speed ratio change, the hydraulic control system should receive a regular hydraulic pressure. Thus, the hydraulic pressure generated from the oil pump is always controlled in a regular line pressure by a regulator valve.

The regulator valve is designed to control the hydraulic pressure in two modes, including a driving mode and a reverse mode.

However, since the hydraulic pressure becomes a fixed hydraulic pressure at the drive and reverse modes, respectively, when the shift lever is changed from the neutral "N" range to the drive "D" range, a shift impact occurs.

Accordingly, to decrease the shift impact caused by shifting the shift lever from the neutral "N" range to the drive "D" range, an N–D control valve is employed. However, the hydraulic control system employing the N–D control valve has a problem that the drive efficiency is deteriorated since the hydraulic control system always uses the fixed hydraulic pressure.

Additionally, since a reducing valve which reduces the hydraulic pressure to be lower than the line pressure to operate a pressure control valve and a damper clutch control valve is controlled by an elastic force of an elastic member and the line pressure, the operation of the reducing valve is unreliable.

Further, a damper clutch employed for increasing a mechanical efficiency of power transmission in a torque converter is engaged or released by a damper clutch control valve. Since a position of a valve spool of the damper clutch control valve is determined in accordance with the elastic force of the elastic member and a disparity in an area of lands of the valve spool, there is a problem that the valve spool may become stuck.

SUMMARY OF THE INVENTION

It is an object of the present invention to provide a hydraulic control system for an automatic transmission, which can minimize a loss of drive of an oil pump.

It is another object of the present invention to provide a hydraulic control system for an automatic transmission, which can ensure a control of a damper clutch and minimize a shift impact thereby increasing hydraulic pressure stability.

To achieve the above objects, the present invention provides a hydraulic control system for an automatic transmission, the system comprising:

an oil pump for generating hydraulic pressure;

a plurality of shift valves for controlling a plurality of clutch and brake means with the hydraulic pressure in accordance with a vehicle's drive and reverse speed and transmitting a torque of a torque converter to a gear of a multi-stage transmission gear mechanism;

a manual valve for selectively supplying the hydraulic pressure generated from the oil pump to each shift valve by changing ports thereof in accordance with a position of a shift lever;

a reducing valve for regulating the hydraulic pressure generated from the oil pump to be lower than a line pressure;

a pressure regulating valve for receiving a control pressure by communicating with the manual valve, and changing the line pressure by opening or closing an exhaust port thereof, the opening or closing of the exhaust port is accomplished when the valve spool of the pressure regulating valve is moved by the hydraulic pressure which is reduced at the reducing valve;

a rear clutch exhaust valve for directly supplying the hydraulic pressure supplied from the manual valve to a rear clutch in a first forward speed ratio of a drive "D" range;

two shift control solenoid valves, which are controlled to be turned "OFF" or "ON" by a transmission control unit, for supplying the hydraulic pressure supplied from the manual valve to a second, third and fourth speed lines in second, third, and fourth forward speed ratios, respectively;

a shift control valve for selectively opening the second, third, and fourth speed lines by moving a valve spool thereof which is moved in accordance with the ON/OFF operation of the shift control solenoid valves; and a damper clutch control valve for supplying the hydraulic pressure to a damper clutch engaging line or releasing line by moving a valve spool thereof which is moved in accordance with exhausting or cutting off the hydraulic pressure of the reducing valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
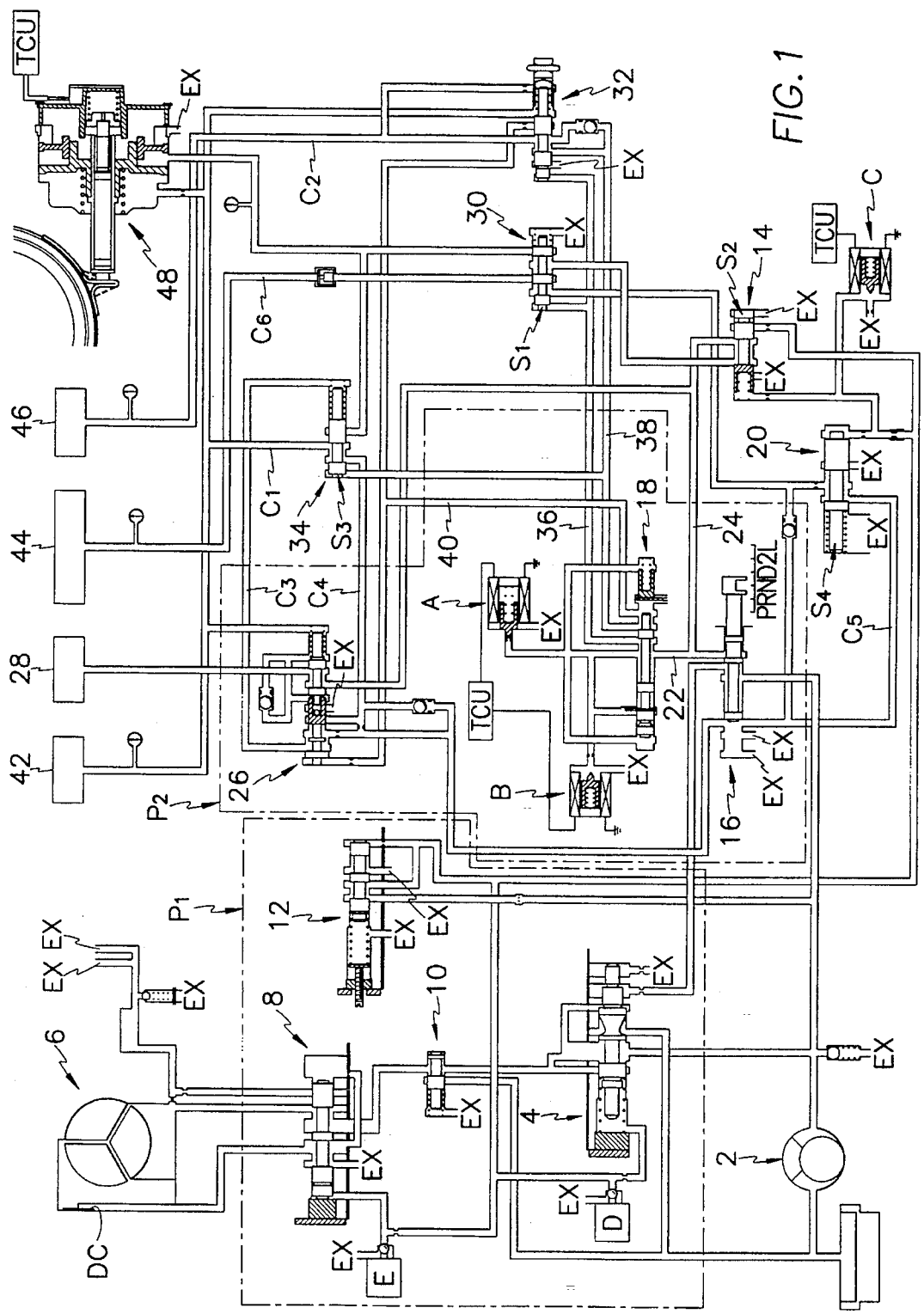
FIG. 1 is a schematic diagram of a hydraulic control system according to the present invention.

Referring to FIG. 1, a hydraulic control system comprises an oil pump 2 for generating a hydraulic pressure by way of a driving force of an engine (not shown), a pressure regulating valve 4 for regulating a line pressure supplied from the oil pump 2, and a torque converter 6 for transmitting the driving force of the engine to an input shaft of the transmission.

The torque converter 6 directly or indirectly transmits the driving force of the engine to the input shaft of the transmission by way of the damper clutch control valve 8 which controls the hydraulic pressure working on a damper clutch DC.

The damper clutch control valve 8 is designed to receive the hydraulic pressure which is controlled by a torque converter control valve 10 which regulates the hydraulic pressure of the torque converter 6 and the hydraulic pressure used for lubricating when the damper clutch is disengaged.

The hydraulic pressure generated from the oil pump 2 is further supplied to a reducing valve 12 and controlled to be lower than the line pressure, and the controlled hydraulic pressure controls each valve spool of a pressure control valve 14, the hydraulic pressure regulator valve 4, and the damper clutch valve 8.

The hydraulic pressure generated from the oil pump 2 is further supplied to a manual valve 16. Ports of the manual valve are changed by a shift lever (not shown). Thus the hydraulic pressure is supplied in accordance with a position of a valve spool of the manual valve 16 to a shift control valve 18, the pressure control valve 14, and an N-R control valve 20 which reduces the shift impact when the shift lever is shifted from the neutral "N" range to the reverse "R" range.

The hydraulic pressure is supplied to a rear clutch exhaust valve 26 through a first-speed line 24 which is branched off from a line 22 which connects the manual valve 16 to the shift control valve 18. A rear clutch 28 receives the hydraulic pressure in accordance with a change of ports of the rear clutch exhaust valve 26 and is engaged thereby.

A valve spool of the shift control valve 18 changes in its position by two shift control solenoid valves A, B. The shift control solenoid valves A, B are controlled to be turned "ON/OFF" by a transmission control unit TCU, such that the hydraulic pressure supplied from the line 22 is supplied in accordance with the position of the valve spool of the shift control valve 18 to a 1st–2nd speed shift valve 30, an end clutch valve 32, and a 2nd–3rd/4th–3rd speed shift valve 34 through second, third and fourth speed lines 36, 38 and 40, respectively.

The shift valves are designed to selectively supply the hydraulic pressure to a front clutch 42, a low/reverse brake 44, an end clutch 46, and a kick-down servo 48 thereby engaging them selectively.

Each port of an N-R control valve 20 and the pressure control valve 14 is changed by a solenoid valve C controlled by the transmission control unit TCU.

Each port of the pressure regulator valve 4 and the damper clutch control valve 8 is changed by each of solenoid valves D, E.

Figure 2:
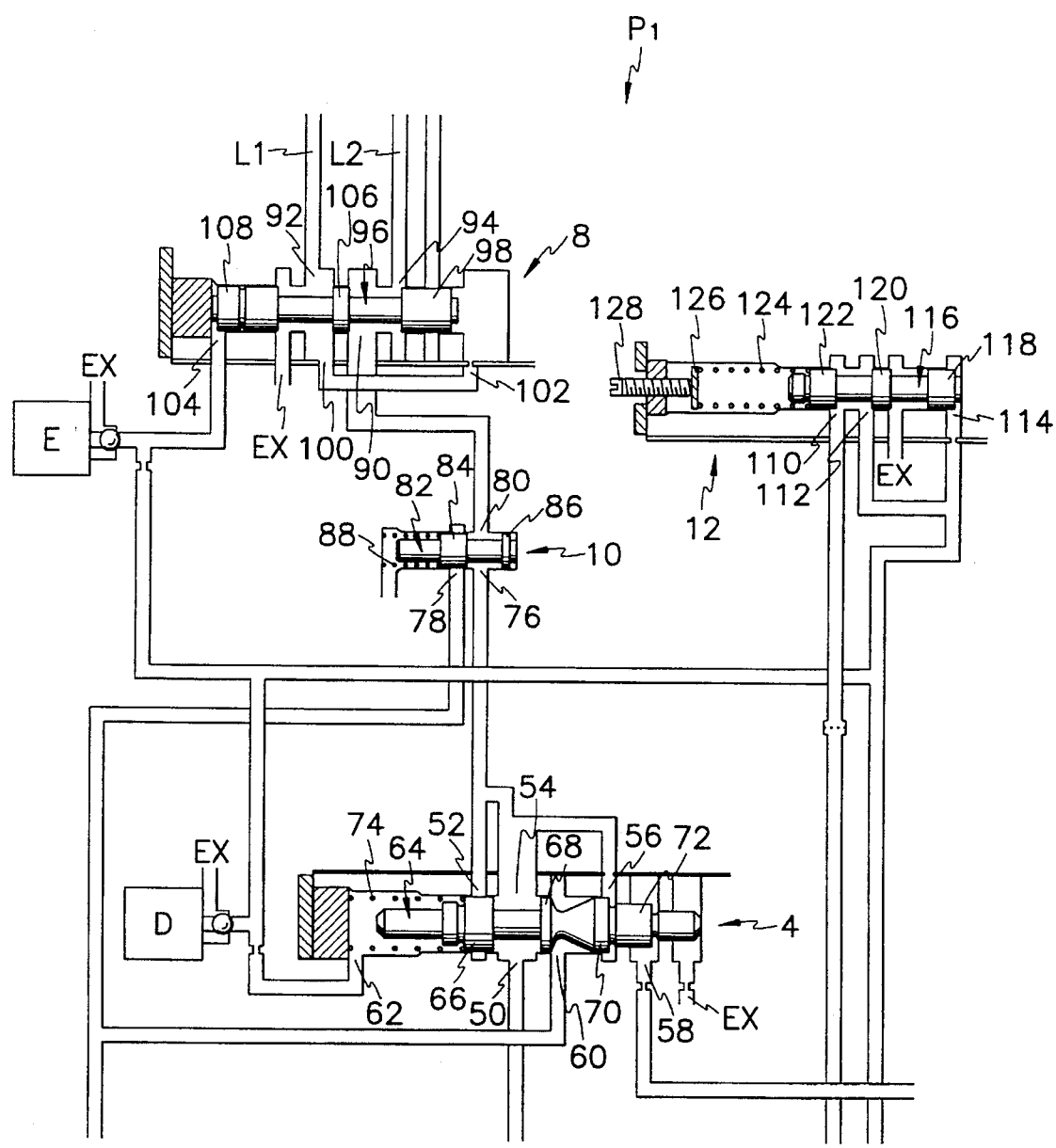
FIG. 2 is a detailed view of a part P1 in FIG. 1.

FIG. 2 is a detailed view of a part P1 in FIG. 1, wherein the pressure regulating valve 4 includes a first port 50 into which the hydraulic pressure flows, a second port 52 for supplying the hydraulic pressure to the torque converter control valve 10, a third port 54, a fourth port 56 communicating with the third port 54, a fifth port 58 which is connected with the manual valve 16 to change the line pressure at the drive "D" range, and a sixth port 60 through which the hydraulic pressure is exhausted when it becomes high.

The pressure regulating valve 4 further includes a seventh port 62 on which the hydraulic pressure is formed or through which the hydraulic pressure is exhausted by the solenoid valve D.

The pressure regulating valve 4 further includes a valve spool 64 which selectively opens and closes the sixth port. The valve spool includes a first land 66, a second land 68, a third land 70, and a fourth land 72. The first land 66 is elastically supported by an elastic member 74 and is designed to always receive a force rightward in the drawing.

The torque converter control valve 10 includes a first port 76 connected to the second port 52 of the pressure regulator valve 4 to receive the hydraulic pressure, a second port 78 through which the hydraulic pressure is exhausted, and a third port 80 through which the hydraulic pressure is supplied to the damper clutch control valve 8.

The torque converter control valve 10 further includes a valve spool 82 having a first land 84 for opening and closing the second port 78 and a second land 86 where the by-pass passage is formed for the hydraulic pressure to work on a right side surface of the second land thereby moving the valve spool 82. The first land 84 is elastically supported by an elastic member 88 thereby receiving a force rightward in the drawing.

The damper clutch control valve 8 includes a first port 90 for receiving the hydraulic pressure from the third port 80 of the torque converter control valve 10, a second port 92 for supplying the hydraulic pressure supplied through the first port 90 to the damper clutch release line L1 of the torque converter, a third port 94 for supplying the hydraulic pressure flowing through the first port 90 to the damper clutch engaging line L2 of the torque converter, fourth and fifth ports 100,102 through which the hydraulic pressure supplied through the first port 90 is supplied to a right side of a first land 98 of a valve spool 96, and a sixth port 104 for moving the valve spool 96 leftward in accordance with an operation of the solenoid valve E.

The valve spool 96 further includes a second land 106 and a third land 108 which moves between the first port 90 and the fourth port 100 to open and close them.

The reducing valve 12 includes a first port 110 through which the hydraulic pressure is supplied, a second port 112 through which the hydraulic pressure supplied through the first port 110 is reduced and flows out, and a third port 114 communicating with the second port to receive the hydraulic pressure working on the right side of a first land 118 of a valve spool 116.

The valve spool 116 further includes a second land 120 for controlling an opening area of the second port 112, and a third land 122 for controlling an opening area of the first port 110. The third land 122 is elastically supported by an elastic member 124.

The elastic member 124 is contacted at its one end with an operation plate 126. The operation plate is designed to be moved leftward or rightward by a screw 128 penetrating a valve body to vary an elastic force of the elastic member 124.

The second port 112 of the reducing valve 12 is connected to the seventh port 62 of the pressure regulating valve 4 and the sixth port 104 of the damper clutch control valve 8, such that a reduced hydraulic pressure is supplied thereto.

Figure 3:
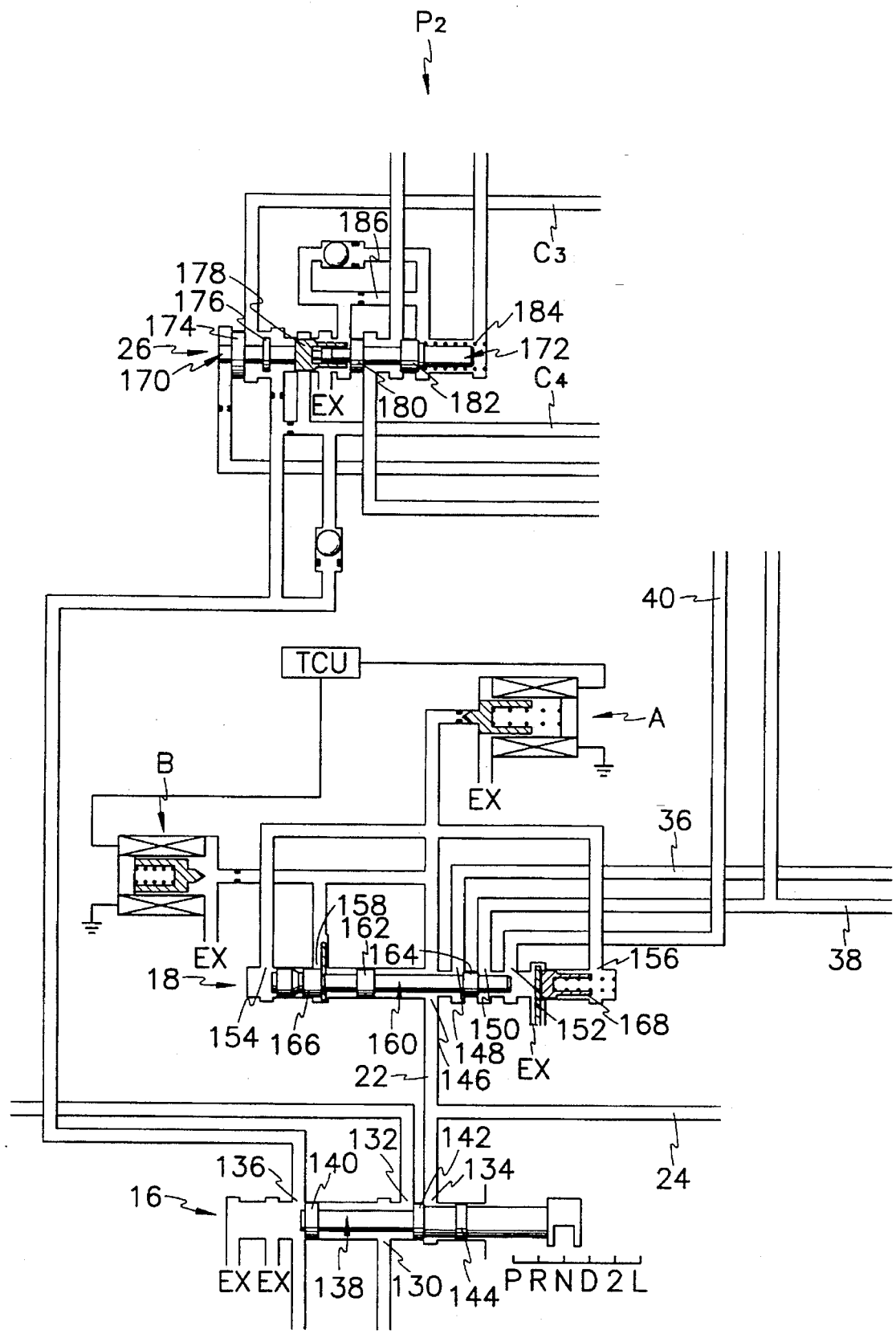
FIG. 3 is a detailed view of a part P2 in FIG.1.

FIG. 3 is a detailed view of a part P2 in FIG. 1, in which the manual valve 16 includes a first port 130 for receiving the hydraulic pressure generated from the oil pump, a second port 132 for supplying the hydraulic pressure to the fifth port 58 of the pressure regulating valve 4, and a third port 134 for supplying the hydraulic pressure to the shift control valve 18 and the rear clutch exhaust valve 26.

The manual valve 16 further includes a fourth port 136 for supplying the hydraulic pressure to the 2nd–3rd/4th–3rd speed shift valve 34 through the rear clutch exhaust valve 26, and the front clutch 42 so as to engage them under pressure, and to the kick-down servo 48 so as to release it.

The manual valve 16 further includes a valve spool 138 which co-operates with the shift lever (not shown). The valve spool 138 has first, second, and third lands 140, 142 and 144. When the shift lever is shifted to the neutral "N" range, the second land 142 is moved to between the second port 132 and the third port 134, whereby the hydraulic pressure can not be supplied to the shift control valve 18.

The shift control valve 18 includes a first port 146 which communicates with the line 22 to receive the hydraulic pressure, a second port 148 which communicates with the second speed line 36, a third port 150 which communicates with the third speed line 38, and first, second and third control ports 154, 156 and 158 which regulate the hydraulic pressure in accordance with the solenoid valves A, B.

The shift control valve 18 further includes a valve spool 160 having a relatively large land 162 and a relatively small land 164, a first plug 166 which is disposed at a left side of the valve spool 160 and is operated by the hydraulic pressure supplied through the first control port 154, and a second plug 168 which is disposed at a right side and is operated by the hydraulic pressure supplied through the second control port 156.

The rear clutch exhaust valve 26 is designed to exhaust the hydraulic pressure which engages the rear clutch at the fourth speed in drive "D" range, in which the valve 26 includes a first valve spool 170 and a second valve spool 172.

The first valve spool 170 includes a relatively large first land 174, a second land 176, and a third land 178 having a small diameter at its middle portion.

The second valve spool 172 includes first and second lands having the same area as each other, and is elastically supported at its right side by an elastic member 184. In the fourth speed of drive "D" range, the hydraulic pressure supplied through the fourth speed line 40 of the shift valve 18 works on the right side surface of the first land 174 of the first valve spool 170, such that the first and second valve spools 170, 172 are moved rightward. Therefore, the small diameter portion of the third land 178 of the first valve spool 170 is located at a by-pass line 186, such that the hydraulic pressure of the rear clutch is exhausted.

The hydraulic control system of the present invention as described above generates the hydraulic pressure by use of the oil pump 2 when the engine starts.

The hydraulic pressure generated at this point flows into the first port 50 of the pressure regulating valve 4, the first port 110 of the reducing valve 12, and the first port 130 of the manual valve 16.

FIG. 1 is a view showing the hydraulic control system in neutral "N" range mode. When the shift lever is shifted from this mode to the drive "D" range mode, the valve spool 138 of the manual valve 16 is moved rightward and the second land 142 is located at a right side of the third port 134, such that the third port 134 communicates with the first port 130.

As a result, the hydraulic pressure flows into the first port 146 of the shift control valve 18. At this point, in the first forward speed ratio, since both of the shift control solenoid valves A, B are controlled to be turned "ON" by the transmission control unit TCU, the hydraulic pressure supplied to the first, second, and third control ports 154, 156 and 158 is exhausted.

Accordingly, the valve spool 160 is moved leftward by the hydraulic pressure working on a right side surface of the first land 162 which is larger than the second land 164, whereby the first plug 166 is moved leftward to cut off the second port 148.

However, the hydraulic pressure branched off from the line 22 is supplied to the rear clutch exhaust valve 26, and thereby to the rear clutch 28 through and between the first and second lands 180, 182 of the second valve spool 172 so as to engage the rear clutch 28, thereby realizing the first forward speed ratio.

When the rear clutch 28 is engaged, the transmission receives a driving force of the engine. At this point, if a slip of the rear clutch is sensed by the transmission control unit TCU, the transmission control unit TCU controls the solenoid valve D to be turned "OFF" to increase the hydraulic pressure which flows into the seventh port 62 of the pressure regulating valve 4.

Accordingly, since the valve spool 64 is designed to be moved rightward, the second land 66 is located between the first port 50 and sixth port 60 for exhausting, the hydraulic pressure is cut off, such that all the hydraulic pressure generated from the oil pump works as the line pressure.

On the contrary, if the slip of the rear clutch does not occur, the transmission control unit TCU controls the solenoid valve D to be turned "ON" to exhaust the hydraulic pressure which flows into the seventh port 62 of the pressure regulating valve 4.

Accordingly, since the valve spool 64 is designed to be moved rightward by the hydraulic pressure working on a right side surface of the third land 70, the sixth port 60 for exhausting is to communicate with the first port 50, such that a portion of the hydraulic pressure is exhausted.

Since this operation as described above is repeatedly accomplished by the transmission control unit TCU which senses the slip of the rear clutch and the line pressure is regulated thereby, the drive efficiency of the oil pump is increased and when the shift lever is shifted from the drive "D" range to the neutral "N" range, a shift impact does not occur whereby an N–D control valve which has been used for reducing the shift impact in the conventional art is not needed Further, if a vehicle speed is gradually increased in a state of the first forward speed ratio, the transmission control unit TCU controls the shift control solenoid valve A to be turned "OFF" to form the hydraulic pressure at the first control port 154. By the operation, the first plug 166 is moved rightward while pushing the valve spool 160.

As a result, the second land 164 of the valve spool 160 is located between the second port 148 and the third port 150 such that the hydraulic pressure flowing into the first port 146 is supplied to the second speed line 36.

The hydraulic pressure supplied to the second speed line 36 is supplied to a left side of the 1st–2nd shift valve 30 and pushes the valve spool S1 rightward, and at the same time, a portion of the hydraulic pressure of the first speed line 24 is supplied to the pressure control valve 14.

At this point, the transmission control unit TCU controls the solenoid valve C with a duty control to be turned "OFF" thereby increasing the hydraulic pressure By the operation, the valve spool S2 of the pressure control valve 14 moves rightward, such that the hydraulic pressure supplied from the first speed line 24 is U-turned and flows into the 1st–2nd shift valve 30.

At this point, since the valve spool S1 of the shift valve 30 is in a state of being pushed rightward, the hydraulic pressure is supplied to the kick-down servo 48 to engage it, thereby accomplishing the second forward speed ratio.

Further, if the vehicle speed gradually increases in a state of the second forward speed ratio, the transmission control unit TCU controls the shift control solenoid valve B to be turned "OFF" as well as the shift control solenoid valve A to increase the hydraulic pressure of the first and second control port 154, 156.

Accordingly, the valve spool 160 of the shift control valve 18 in the state of second forward speed ratio is moved by the hydraulic pressure working on a left side surface of the first land 162.

By the operation, the second land 164 of the valve spool 160 is located between the third port 150 and the fourth port 152, such that the hydraulic pressure supplied to the first port 146 is supplied to the second and third speed lines.

Accordingly, a portion of the hydraulic pressure of the third speed line 38 flows into a left side of the shift valve 34 thereby moving the valve spool S3 rightward to contact the second plug 168.

By the operation, a portion of hydraulic pressure supplied from the 1st–2nd shift valve 30 to the kick-down servo 48 is supplied to the 2nd–3rd/4th–3rd shift valve 34 and thereby to the front clutch 42 as an engaging pressure through the line C1, and at the same time, works on the kick-down servo 48 as a release pressure.

Further, a portion of the hydraulic pressure of the third speed line 38 is supplied to the end clutch valve 32 and thereby to the end clutch 46 through the line C2 to engage it. In consequence, all of the front clutch 42, rear clutch 28 and the end clutch 46 are engaged thereby realizing the third forward speed ratio.

Further, if the vehicle speed gradually increases in a state of the third forward speed ratio, the transmission control unit TCU controls the shift control solenoid valves B, A to be turned "OFF" and "ON", respectively, such that the hydraulic pressure is not formed at the first and second control ports 154, 156 but is formed at the third control port 158.

Accordingly, the valve spool 160 of the shift control valve 18 is more moved rightward while pushing the second plug 168. By the operation, all the ports 148, 150, 152 are to open, such that the hydraulic pressure is supplied to all of the second, third, and fourth speed lines 36, 38 and 40 simultaneously, This is to realize the fourth forward speed ratio. In the fourth forward speed ratio, the rear clutch 28 and the front clutch 42 are released and the kick-down servo 48 is engaged.

When the hydraulic pressure of the fourth speed line 40 flows into a left side of the rear clutch exhaust valve 26, the hydraulic pressure works on a left side surface of the first land 174 having the largest land and pushes the first and second valve spools 170, 172 rightward, and at the same time, is supplied to a right side of the 2nd–3rd/4th–3rd shift valve 34 through the line C3 so that the valve spool S3 is again moved leftward, whereby the engagement and release of the clutches 28, 42 and kick-down servo 48 are realized.

Further, when the shift lever is shifted to the reverse "R" range, the valve spool 138 of the manual valve 16 is moved leftward, such that the second land 142 is located between the first port 130 and the second port 132, and the first land 140 is located at a left side of the fourth port 136.

A portion of hydraulic pressure supplied to the first port 130 is supplied to the rear clutch exhaust valve 26 through the fourth port 136 and thereby to the right side of the 2nd–3rd/4th–3rd shift valve 34 through the line C3, such that the valve spool is moved leftward, and at the same time, the hydraulic pressure is supplied to the line C1 through the line C4 to engage the front clutch 42.

Further, a portion of hydraulic pressure flowing into the first port 146 of the manual valve 16 is supplied to the N–R control valve through the line C5. At this point, since the transmission control unit TCU controls the solenoid valve C to be turned "OFF" with the duty control, the valve spool S4 of the N–R control valve 20 is moved leftward, such that the hydraulic pressure of the line C5 is supplied to the 1st–2nd speed shift valve and thereby to the low/reverse brake 44 through the line C6.

During this operation, a portion of the hydraulic pressure generated from the oil pump 2 flows into the first port 110 of the reducing valve 12 and is exhausted through the second port 112. At this point, a portion of the hydraulic pressure flows into the third port 114 and works on a right side surface of the first land 118, such that the position of the valve spool 116 is changed in accordance with the line pressure. That is, if the line pressure is high, the opening area of the second port 112 is reduced, and if the line pressure is low, the opening area of the second port 112 is increased, whereby the hydraulic pressure is stably supplied.

Further, if the damper clutch enters into a field of engagement, the transmission control unit TCU controls the solenoid valve E to be turned "ON" such that the hydraulic pressure supplied from the second port 112 of the reducing valve 12 is not supplied to the sixth port 104 of the damper clutch control valve 8 but is exhausted.

By the above operation, although the valve spool is moved rightward, the hydraulic pressure supplied from the third port 80 of the torque converter 10 is supplied to the fifth port 102 via the fourth port 100 and works on the right side of the first land 98 of the valve spool 96. As a result, the valve spool is moved leftward.

Accordingly, the hydraulic pressure flowing into the first port 90 is supplied to the line L2 to engage the damper clutch DC.

Further, if the damper clutch does not enter into a field of engagement, the transmission control unit controls the solenoid valve E to be turned "OFF" such that the hydraulic pressure of the sixth port 104 of the damper clutch control valve 8 is high whereby the valve spool 96 is moved leftward.

Accordingly, the hydraulic pressure flowing into the first port 90 is supplied to the torque converter 6 via the line L1 to release the damper clutch DC.

This damper clutch control method prevents a valve stick phenomenon which appears in a valve structure using a spring, since the valve spool is regulated by the reducing pressure to be moved leftward or rightward.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic pressure control system for an automatic transmission, the system comprising:

an oil pump for generating the hydraulic pressure;

a plurality of shift valves for controlling a plurality of clutch and brake means with the hydraulic pressure in accordance with a vehicle's drive and reverse speed and transmitting a torque of a torque converter to a gear of a multi-stage transmission gear mechanism;

a manual valve for selectively supplying the hydraulic pressure generated from the oil pump to each shift valve by changing ports thereof in accordance with a position of a shift lever;

a reducing valve for regulating the hydraulic pressure generated from the oil pump to be lower than a line pressure;

a pressure regulating valve for receiving a control pressure by communicating with the manual valve, and changing the line pressure by opening or closing an exhaust port thereof, the opening or closing of the exhaust port occurring when the valve spool of the pressure regulating valve is moved by the hydraulic pressure which is reduced at the reducing valve;

a rear clutch exhaust valve for directly supplying the hydraulic pressure supplied from the manual valve to a rear clutch in a first drive speed ratio of a drive "D" range;

two shift control solenoid valves, which are controlled to be turned "OFF" or "ON" by a transmission control unit, for supplying the hydraulic pressure supplied from the manual valve to second, third and fourth speed lines in second, third and fourth forward speed ratios, respectively;

a shift control valve for selectively opening the second, third and fourth speed lines by moving a valve spool thereof which is moved in accordance with the ON/OFF operation of the shift control solenoid valves; and a damper clutch control valve for supplying the hydraulic pressure to a damper clutch engaging line or releasing line by moving a valve spool thereof which is moved in accordance with exhausting or cutting off the hydraulic pressure of the reducing valve.

2. The hydraulic pressure control system of claim 1, wherein the pressure regulating valve includes a first port into which the hydraulic pressure flows; second and third ports for supplying the hydraulic pressure as an engaging pressure to the torque converter and the damper clutch; a fourth port communicating with the third port to produce a control pressure; a fifth port which is connected with the manual valve; a sixth port through which the hydraulic pressure is exhausted when becomes high; and a seventh port communicating with the reducing valve.

3. The hydraulic pressure control system of claim 1, wherein the reducing valve includes a first port through which the hydraulic pressure is supplied; a second port through which the hydraulic pressure supplied through the first port is reduced and flowed out; a third port communicating with the second pore to receive the hydraulic pressure; a valve spool having first, second, and third lands for regulating an opening area of the ports; and an elastic member for regulating an elastic force of the valve spool.

4. The hydraulic pressure control valve system of claim 1, wherein the damper clutch control valve includes: a first pore through which the hydraulic pressure for engaging the torque converter is supplied; a second port for supplying the hydraulic pressure supplied through the first port to the damper clutch release line of the torque converter; a third port for supplying the hydraulic pressure supplied through the first port to the damper clutch engaging line of the torque converter; fourth and fifth ports through which the hydraulic pressure supplied through the first port is supplied to a right side of a first land of a valve spool; and a sixth port for moving the valve spool leftward in accordance with an operation of a solenoid valve.

* * * * *